(12) United States Patent
Leon

(10) Patent No.: US 7,172,136 B2
(45) Date of Patent: Feb. 6, 2007

(54) STRUCTURAL MEMBERS FABRICATED FROM WASTE MATERIALS AND METHOD OF MAKING THE SAME

(76) Inventor: Joseph Leon, 3216 La Costa St., # A, Bakersfield, CA (US) 93306

( * ) Notice: Subject to any disclaimer, the term of this patent is extended or adjusted under 35 U.S.C. 154(b) by 0 days.

(21) Appl. No.: 11/080,080

(22) Filed: Mar. 14, 2005

(65) Prior Publication Data
US 2005/0166535 A1 Aug. 4, 2005

Related U.S. Application Data

(63) Continuation-in-part of application No. 10/696,480, filed on Oct. 28, 2003, now abandoned.

(60) Provisional application No. 60/309,039, filed on Jul. 30, 2001.

(51) Int. Cl.
*E01B 3/00* (2006.01)
(52) U.S. Cl. ...................................................... 238/85
(58) Field of Classification Search .................. 238/83, 238/84, 85, 92, 91
See application file for complete search history.

(56) References Cited

U.S. PATENT DOCUMENTS

| | | | | | |
|---|---|---|---|---|---|
| 3,908,902 | A | * | 9/1975 | Collins et al. ................ | 238/83 |
| 4,095,985 | A | * | 6/1978 | Brown ...................... | 106/18.11 |
| 4,150,790 | A | * | 4/1979 | Potter ........................... | 238/83 |
| 5,055,350 | A | * | 10/1991 | Neefe ........................... | 238/84 |
| 5,238,734 | A | * | 8/1993 | Murray ......................... | 238/83 |
| 5,609,295 | A | * | 3/1997 | Richards ...................... | 238/84 |
| 6,191,228 | B1 | * | 2/2001 | Nosker et al. ................. | 238/84 |
| 6,247,651 | B1 | * | 6/2001 | Marinelli ...................... | 238/84 |
| 6,372,069 | B1 | * | 4/2002 | Walls ........................... | 156/95 |
| 6,708,896 | B2 | * | 3/2004 | Robinson ...................... | 238/84 |

* cited by examiner

*Primary Examiner*—Lars A. Olson
(74) *Attorney, Agent, or Firm*—Dennis W. Beech

(57) ABSTRACT

The structural member and fabrication thereof may be formed by mixing wood products chemically treated for durability and thermoplastics products. The fabrication process may included processing the products to a desired particle size; mixing the particles; processing the mixture in a high intensity processor and then processing the mixture in an extruder to obtain a molten state for forming the structural element in a mold. It is emphasized that this abstract is provided to comply with the rules requiring an abstract that will allow a search or other reader to quickly ascertain the subject matter of the technical disclosure. It is submitted with the understanding that it will not be used to interpret or limit the scope or meaning of the claims.

20 Claims, 1 Drawing Sheet

STRUCTURAL MEMBERS FABRICATED FROM WASTE MATERIALS AND METHOD OF MAKING THE SAME

CROSS-REFERENCE TO RELATED APPLICATIONS

This application claims the benefit of U.S. Provisional Application Ser. No. 60/309,039 filed Jul. 30, 2001, U.S. application Ser. No. 10/206,160, filed Jul. 25, 2002 and U.S. application Ser. No. 10/696,480 filed Oct. 28, 2003. This is a continuation-in-part of U.S. patent application Ser. No. 10/696,480 that is now abandoned.

BACKGROUND OF THE INVENTION

The present invention generally relates to materials used for the fabrication of structural members. More specifically, the present invention relates to processing chemically treated wood products and wood waste from wood biomass from forest or wood industries and fabricating such products and waste, along with waste thermoplastic, into useful structural members. These chemically treated wood products, wood waste and waste thermoplastic otherwise must be disposed, which is expensive and/or difficult.

Many wooden materials used as structural members must be chemically treated to render the wood suitable for the particular use or purpose. For example, wooden poles, posts and cross-members used for supporting utility lines, railroad cross-ties, and signs are usually pressure treated with creosote oil, which acts as a fungicide, germicide and insecticide to protect those members from various forms of fungal, bacterial and insect attack. Other chemicals are used to accomplish these purposes.

The benefits of chemically treated wooden structural members are well documented. For example, the life expectancy for untreated railroad ties installed during 1900 was four to six years. However, the life expectancy for ties treated with coal tar creosote is approximately thirty years. Nevertheless, because of the tremendous amount of railroad track in service, railroads in the a railroad tie remains relatively short because the ties are subject to substantial compressional and impact stresses as train cars travel over the rails. Because the pressure treatment does not penetrate the entire matrix of a wooden structural member, cracking of the outside structure can provide a pathway for water and microorganisms to invade untreated wood within the tie. The wood ultimately rots and deteriorates under train traffic. These same types of problems exist for other creosote treated wooden members which, according to the particular use, experience various types of environmental exposure and are subject to dynamic loading and the related stresses. Because these members have a limited life span, there is an ongoing demand for these structural members for application in both new and existing installations. The demand is aggravated by diminishing natural resources, including the hardwood from which most of these products are manufactured.

In addition to a supply shortage, an additional problem exists regarding chemically treated wooden members. Because a tremendous number of these members must be replaced each year, disposal is required for the removed members. However, because of the chemical treatment of these members with creosote oil and other substances that have been classified as hazardous substances, disposal of these items can be difficult and expensive. Various solutions have been proposed for disposal of the chemically treated wood as opposed to landfill disposal. Railroad crossties are commonly used for building retaining walls, raised gardens and other landscaping projects. Another proposed solution is to reduce the wooden members to mulch like material and use the material as fuel in wood fired boilers to generate electricity. There have also been proposals for recycling the wooden members to be reused for the same purpose. While these proposals seemingly solve two problems at once, to date none have widely been accepted. Part of the problem is that transporting the used materials for processing is itself prohibitively expensive. Regarding recycling members, the known processes result in a laminated final product that raises concerns about the integrity of the member at the layer boundaries.

In addition to disposing of chemically treated wooden structures, disposal of plastic structures and plastic waste is an ongoing problem. Plastic structures and plastic waste can be bulky and consume valuable landfill space. Although the recycling of plastics has been increasing, depending upon the particular application, some plastics are not acceptable.

The disclosed structural members solve the above problems. The disclosed process for manufacturing the structural members may be located on site or located immediately adjacent to a railroad siding, thereby eliminating or greatly reducing the transportation costs of other methods. The disclosed structural members may have no layering but rather have a uniform matrix. The disclosed process uses recycled thermoplastics to fabricate the disclosed structural members, thereby having the added benefit of providing an alternative used for plastics which might otherwise be discarded.

SUMMARY OF THE INVENTION

The present invention may be directed to a structural member which may be manufactured from previously chemically treated wood or other waste wood from wood biomass from forest or wood industries, which has the structural integrity to be used as a structural member for utility lines, railroads, pier construction, fence posts, plant stakes, traffic highway dividers, temporary traffic dividers or K-rail, guard rail posts and blocks, fence block, erosion prevention railing and other applications where strength may be required, where there may be exposure to bacterial and insect attack, and where long life may be necessary because, among other reasons, repair expense may be prohibitive because of the expense of taking the particular system out of service to effect the repair.

The present invention further comprises a method of producing the disclosed structural members from chemically treated wood which otherwise must be disposed of at considerable expense. Such treated wood may include wood that has been painted, laminated wood, Formica, utility poles and cross-members, railroad ties, etc. The disclosed method may further comprise the processing of the members being replaced, thereby eliminating or reducing the disposal costs for the old structural members. The method of processing may be configured to be mobile, thereby allowing the structural members to be manufactured onsite and reducing or eliminating handling and transportation expenses for the materials being replaced. The disclosed method may further comprise the use of recycled thermoplastic, the thermoplastic acting as both a binder and an encapsulator. Both polyethylene and/or polypropylene, as well as other thermoplastics may be used in the process.

These and other features, aspects and advantages of the present invention will become better understood with reference to the following drawings, description and claims.

DETAILED DESCRIPTION

Figure 1:
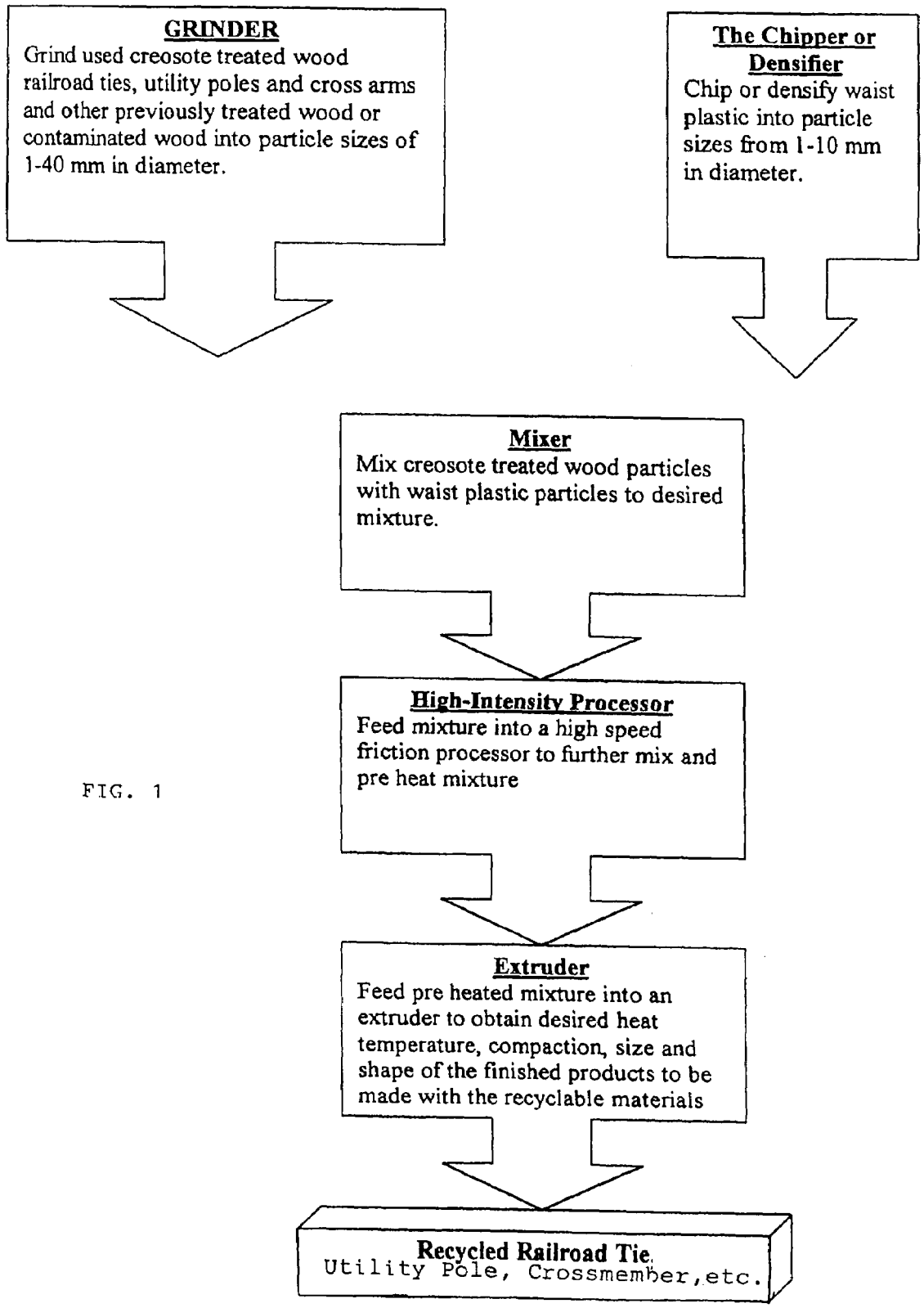
FIG. 1 illustrates a flow diagram outlining the disclosed method and shows a resulting product according to an embodiment of the invention.

The following detailed description represents the best currently contemplated modes for carrying out the invention. The description is not to be taken in a limiting sense, but is made merely for the purpose of illustrating the general principles of the invention.

Referring now to FIG. 1, waste wood, such as chemically-treated railroad ties utility poles, etc., may be placed within a grinder 10 or chipper to obtain a chip size ranging from one to forty millimeters in diameter, the grinder 10 or chipper may be of the type which may be portable and towable. The ideal chip size may range from ten to forty millimeters. One suitable grinder may be a CBI Magnum Force Series 6000 Hz Hog manufactured by Continental Bio-Mass Industries, Inc.

Waste thermoplastic, including polyethylene and/or polypylene or other readily available thermoplastic may also be chipped to obtain a chip or particle size ranging from one to twenty millimeters in diameter. Thermoplastics soften when heated, but harden when cooled. Plastic drums, containers, and plastic structures may be processed through a chipper 20 machine to obtain the desired chip or particle size. Depending upon the thermoplastic, instead of a chipper, a densifyer may be used to cause the plastic to consolidate into the desired particle size. For example, plastic shopping bags cannot be chipped and may instead be processed with a densifyer to consolidate the plastic and obtain plastic particles. The thermoplastic chips may act as binder and as an encapsilator of the wood chips contained within the matrix of the new structural member.

After the desired range of chip sizes has been achieved for the waste wood and the waste thermoplastic, the plastic chips and wood chips may be mixed together, such as in a conventional drum mixer 30. An acceptable mix ratio may be ten to seventy percent-by-weight plastic corresponding to thirty to ninety percent-by-weight wood chips.

The resulting mixture from the mixer 30 may then be fed into a high-speed blender also known as a high intensity processor 40. An acceptable high-speed blender may be that manufactured by Lex Technologies, Inc. of Ontario, Canada. The high-speed blender may have high-speed blades that may impart a shearing force to the mixture that imparts friction to the wood and plastic chips, which may thoroughly mix the wood and plastic chips together and heat up the chip mixture by the friction of the blades. The heated thermoplastic chips, becoming softer, fill the interstitial space between the wood chips, forming a binding agent for adjacent wood chips. In addition the high-speed blender may further reduce the size of the wood chips and plastic chips, resulting in a more consolidated and cohesive mixture.

After the desired consistency is achieved with the high-speed blender, the mixture may be fed into an extruder 50 that may be of the ram or single or twin screw type having the capability to heat the barrel. The extruder 50 compresses the mixture, thereby heating the mixture to a temperature in a range from 150 degrees to 275 degrees Centigrade. A molten mixture may be pumped or pulled from the extruder 50 into molds that are specially prepared according to the specific size and shape of the member required. The molds may be preset or prestressed with the specific reinforcement component for the structural member to be produced, for example, a plurality of tire tread strip elements that may be stapled or wired together to from a cable may be positioned in and prestressed the full length of the mold. Following cooling, the plastic-wood members may be removed from the molds, inspected, stored for curing and then installed as desired. The new structural members may have a uniform dispersion of creosote oil or other substance that were used for treating the source wood, showing a further benefit of the disclosed invention. As discussed above, because pressure treatment is unable to reach the core of the wooden members with the treating substance, wooden members may be vulnerable to fungal, bacterial and insect attack if the inner untreated core is exposed through fracturing or cracking. However, the members formed through the disclosed process may take advantage of any prior treatment compounds used in the source wood and equally dispense those compounds throughout the new structure. If desired, additional treatment chemicals may be added during the mixing stage to achieve desired properties. For example, in addition to creosote oil, it may be desirable to add fire retardant or other substances.

Various molds may be used to form structural members depending on the form to be produced. Additionally, reinforcement elements may be included in a mold for structural strength of the produced structural member. Vehicle tire treads that may be waste from discarded or used tires may be cut into long strips of 1 to 8 inches in width and 4 to 40 feet in length for use as a reinforcement element. If longer length reinforcement elements may be desired, the tire tread strips may be attached end-to-end by use of an attachment device as of example by used of metal staples, wires and the like. The attachment of tire tread strips may create long cables that may be wound on spools for manufacturing of structural members. The tire tread strips may be disposed in a mold and may be prestressed to extend the full length of the mold. The molten mixture may be released from the extruder 50 into the mold to surround the prestressed reinforcement element.

Other reinforcement elements may be used with a structural member for rigidity or weight. For example, where a thin structural element may be formed such as a plant stake or grape stake, a piece of metal rebar, scalloped wire or the like may be disposed in a mold prior to deposit of the molten mixture therein. For larger structural elements, railroad rails may be used as the reinforcement elements for weight required for example for traffic dividers or K-rails and one or more disposed in a mold prior to the molten mixture being released into the mold to surround the reinforcement elements. Use of discarded tires, rebar, wire, railroad rails, wood, bamboo, new or used cable and the like may aid in reducing environmental problems; however, new materials for reinforcement elements may also be used in the process.

Additional elements may be added during the mixing process. A baking soda may be added to the plastic chips and wood chips in the mixer 30 in a 1 to 3 percent by weight ratio of the total mixture. The baking soda may act as an emulsifier. Further, an ultraviolet or UV protection material may be mixed with the other element in the mixer 30 in a 1 to 4 percent by weight ratio of the total mixture. The ultraviolet protection material may be a black color concentrate such as produced by AMPACET.

While the invention has been particularly shown and described with respect to the illustrated embodiments thereof, it will be understood by those skilled in the art that the foregoing and other changes in form and details may be made therein without departing from the spirit and scope of the invention.

I claim:

1. A method for manufacture of structural members from existing wood and thermoplastic products and materials comprising:
   selecting a wood product that has been chemically treated for durability;
   processing said wood product in a grinder to form chemically treated wood particles;
   selecting a thermoplastic and processing said thermoplastic in a chipper to form thermoplastic particles;
   mixing said chemically treated wood particles and said thermoplastic particles in a mixer to form a mixture;
   processing said mixture in a high intensity processor to further mix and preheat said mixture;
   processing said mixture in an extruder to compress and heat said mixture to form a molten mixture;
   disposing a reinforcing element comprising a plurality of tire strips in a mold for forming a structural member;
   placing said molten mixture into said mold for forming said structural member; and
   removing from said mold after cooling has occurred said structural member.

2. The method as in claim 1 wherein said wood product is selected from the group of a wood railroad tie, a wood utility pole, a wood sign post and a wood biomass from forest and wood industries.

3. The method as in claim 1 wherein said thermoplastic is selected from the group of a polyethylene and a polypropylene.

4. The method as in claim 1 wherein said chemically treated wood particles are processed to a size to be a diameter of approximately one to forty millimeters.

5. The method as in claim 1 wherein said thermoplastic particles are processed to a size to be a diameter of approximately one to twenty millimeters.

6. The method as in claim 1 wherein processing said thermoplastic is performed in a densifier.

7. The method as in claim 1 wherein said wood product is a waste material.

8. The method as in claim 1 wherein said thermoplastic is a waste material.

9. The method as in claim 1 wherein said mixture is comprised of approximately ten to seventy percent by weight of said thermoplastic and approximately thirty to ninety percent by weight of said wood product.

10. The method as in claim 1 wherein processing in said high intensity processor further reduces the size of said thermoplastic particles and said chemically treated wood particles.

11. The method as in claim 1 wherein said extruder heats said mixture to approximately a temperature of 150 degrees Centigrade to 230 degrees Centigrade.

12. The method as in claim 1 further comprising the adding of a fire retardant substance during said mixing.

13. The method as in claim 1 further comprising the adding of a baking soda of approximately one to three percent by weight of said mixture during said mixing.

14. The method as in claim 1 further comprising the adding of an ultraviolet protection material of approximately one to four percent by weight of said mixture during said mixing.

15. A structural member produced according to the method of claim 1.

16. A method for manufacture of structural members from existing wood and thermoplastic products and materials, comprising the steps of:
   selecting a wood product that has been chemically treated for durability;
   processing said wood product in a grinder to form chemically treated wood particles of a diameter of approximately one to forty millimeters;
   selecting a thermoplastic and processing said thermoplastic in a chipper to form thermoplastic particles of a diameter of approximately one to twenty millimeters;
   mixing said chemically treated wood particles and said thermoplastic particles in a mixer to form a mixture comprised of approximately ten to seventy percent by weight of said thermoplastic and approximately thirty to ninety percent by weight of said wood product;
   mixing a baking soda comprised of approximately one to three percent by weight of said mixture and an ultraviolet protection material comprised of approximately one to four percent by weight of said mixture in said mixture;
   processing said mixture in a high intensity processor to further mix and preheat said mixture;
   processing said mixture in an extruder to compress and heat said mixture to approximately a temperature of 150 degrees Centigrade to 230 degrees Centigrade to form a molten mixture;
   disposing a reinforcing element comprising a plurality of tire strips of approximately one to eight inches in width that are attached end-to-end to form a cable of approximately 4 to 40 feet in length in a mold for forming a structural member wherein said reinforcement element is prestressed the full length of said mold;
   extruding said molten mixture through said mold for forming said structural member; and
   removing from said mold after cooling has occurred said structural member.

17. A structural member produced according to the method of claim 16.

18. A structural member comprising:
   a mixture of a wood product chemically treated for durability and a thermoplastic;
   wherein said mixture is comprised of approximately ten to seventy percent by weight of said thermoplastic and approximately thirty to ninety percent by weight of said wood product; and
   wherein said mixture has been compressed and heated to allow said thermoplastic to penetrate in said wood product having voids therein; and
   wherein a reinforcing element, comprising a plurality of tire strips of approximately one to eight inches in width that are attached end-to-end to form a cable of approximately 4 to 40 feet in length, has been prestressed the full length of a mold used for said compressing and heating of said mixture is disposed in said structural member.

19. The structural member as in claim 18 wherein said mixture is further comprised of a baking soda of approximately one to three percent by weight of said mixture.

20. The structural member as in claim 18 wherein said mixture is further comprised of an ultraviolet protection material of approximately one to four percent by weight of said mixture.

* * * * *